United States Patent
Saito

(10) Patent No.: US 11,716,541 B2
(45) Date of Patent: Aug. 1, 2023

(54) IMAGE CAPTURING APPARATUS, METHOD OF CONTROLLING IMAGE CAPTURING APPARATUS, SYSTEM, AND NON-TRANSITORY COMPUTER-READABLE STORAGE MEDIUM

(71) Applicant: CANON KABUSHIKI KAISHA, Tokyo (JP)

(72) Inventor: Takao Saito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 17/168,705

(22) Filed: Feb. 5, 2021

(65) Prior Publication Data
US 2021/0258465 A1 Aug. 19, 2021

(30) Foreign Application Priority Data
Feb. 19, 2020 (JP) ................................. 2020-026469

(51) Int. Cl.
*H04N 23/73* (2023.01)
*H04N 23/62* (2023.01)
*H04N 23/71* (2023.01)
*H04N 23/72* (2023.01)

(52) U.S. Cl.
CPC ............ *H04N 23/73* (2023.01); *H04N 23/62* (2023.01); *H04N 23/71* (2023.01); *H04N 23/72* (2023.01)

(58) Field of Classification Search
CPC ...... H04N 23/73; H04N 23/743; H04N 23/70; H04N 23/71; H04N 23/72; H04N 23/60; H04N 23/62
See application file for complete search history.

(56) References Cited

U.S. PATENT DOCUMENTS

| | | | |
|---|---|---|---|
| 2014/0204267 A1* | 7/2014 | Akiba | B60R 1/00 348/362 |
| 2017/0155844 A1* | 6/2017 | Iso | H04N 23/6812 |
| 2017/0171446 A1* | 6/2017 | Nashizawa | G06T 5/007 |
| 2020/0029007 A1* | 1/2020 | Nishitani | H04N 23/743 |
| 2021/0266446 A1* | 8/2021 | Saito | H04N 23/72 |

FOREIGN PATENT DOCUMENTS

JP 2003153073 A 5/2003

* cited by examiner

*Primary Examiner* — Kelly L Jerabek
(74) *Attorney, Agent, or Firm* — Rossi, Kimms & McDowell LLP

(57) ABSTRACT

An image capturing apparatus comprising, an image sensor capable of performing exposure control for each of a plurality of partial regions obtained by dividing an image capturing region, and a control unit configured to perform exposure control of the image sensor, wherein the control unit sets a control value of exposure control for each partial region based on a size of the partial region to decrease a response speed of exposure control for a larger partial region, and performs exposure control of the image sensor based on the set control value.

17 Claims, 5 Drawing Sheets

IMAGE CAPTURING APPARATUS, METHOD OF CONTROLLING IMAGE CAPTURING APPARATUS, SYSTEM, AND NON-TRANSITORY COMPUTER-READABLE STORAGE MEDIUM

BACKGROUND

Field of the Disclosure

The present disclosure relates to an image capturing apparatus, a method of controlling the image capturing apparatus, a system, and a non-transitory computer-readable storage medium.

Description of the Related Art

There is conventionally known a technique of converging the exposure to a correct one always at an appropriate speed when capturing an image of an object (see Japanese Patent Laid-Open No. 2003-153073).

SUMMARY

A technique of adjusting the exposure properly to an object whose brightness has changed abruptly is provided.

One aspect of exemplary embodiments relates to an image capturing apparatus comprising, an image sensor capable of performing exposure control for each of a plurality of partial regions obtained by dividing an image capturing region, and a control unit configured to perform exposure control of the image sensor, wherein the control unit sets a control value of exposure control for each partial region based on a size of the partial region to decrease a response speed of exposure control for a larger partial region, and performs exposure control of the image sensor based on the set control value.

Further features of the disclosure will become apparent from the following description of exemplary embodiments (with reference to the attached drawings).

DESCRIPTION OF THE EMBODIMENTS

Figure 1:
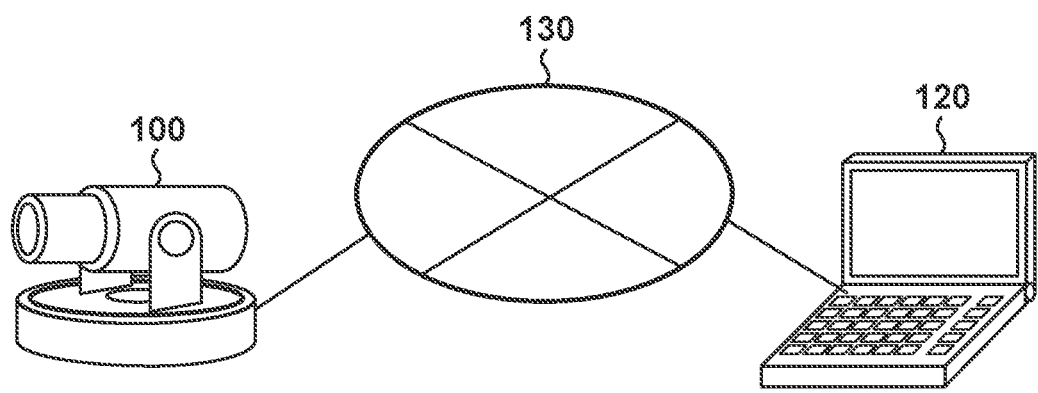
FIG. 1 is a view showing an example of the configuration of a system according to an embodiment.

Exemplary embodiments of the disclosure will now be described in detail in accordance with the accompanying drawings. It should be noted that the following embodiments are not intended to limit the scope of the appended claims. A plurality of features are described in the embodiments. Not all the plurality of features are necessarily essential to the disclosure, and the plurality of features may arbitrarily be combined. In addition, the same reference numerals denote the same or similar parts throughout the accompanying drawings, and a repetitive description will be omitted.

First Embodiment

A system configuration according to the first embodiment will now be described with reference to FIG. 1. FIG. 1 is a view showing an example of the system configuration including an image capturing apparatus 100. The image capturing apparatus 100 and a client apparatus 120 are connected via a network 130 so that they can communicate with each other. The client apparatus 120 transmits various control commands to the image capturing apparatus 100 to designate image capturing conditions. The image capturing apparatus 100 executes image capturing corresponding to the commands, and transmits captured moving and still images to the client apparatus 120.

The image capturing apparatus 100 is a monitoring camera installed in an arbitrary monitoring target section. A case in which an image of a road is captured will be exemplified in the embodiment, but the image capturing apparatus 100 may be installed outside or inside. The image capturing apparatus 100 can also be called a network camera, an image generation apparatus, an image communication apparatus, or the like. The image capturing apparatus 100 is installed to capture an image of a predetermined area (monitoring area) in the monitoring target section, and has a function of distributing captured images (moving and still images) to the client apparatus 120 via the network 130. The image capturing apparatus 100 can have a PTZ (Pan Tilt Zoom) control function and may have a pan head (not shown) for pan and tilt control. A plurality of image capturing apparatuses 100 may be prepared and individually installed to capture images of a plurality of monitoring areas in the monitoring target section.

The client apparatus 120 is an information processing apparatus that communicates with the image capturing apparatus 100 via the network 130 and controls the operation of the image capturing apparatus 100. The client apparatus 120 can also be called a camera control apparatus, an image communication apparatus, an image processing apparatus, or the like. For example, the client apparatus 120 can control the pan head or issue requests to change image quality setting, PTZ control, and the like. The client apparatus 120 transmits various control commands described above to the image capturing apparatus 100. The client apparatus 120 receives via the network 130 moving and still images captured by the image capturing apparatus 100.

The client apparatus 120 can also function as an image analysis apparatus (image processing apparatus or image analyzing apparatus) that analyzes an image captured by the image capturing apparatus 100. The client apparatus 120 can perform processes such as detection and determination of a person present in the monitoring area, and counting of the number of people who passed a specific area (range or position) in the monitoring area. The client apparatus 120 can be implemented as an information processing apparatus such as a personal computer, a server, a smartphone, or a tablet. The client apparatus 120 may be implemented by a single apparatus, or its respective functions may be implemented by a plurality of apparatuses in cooperation. The network 130 may be any digital network such as the Internet or an intranet having a band enough to transmit camera control commands and compressed image signals.

Figure 2:
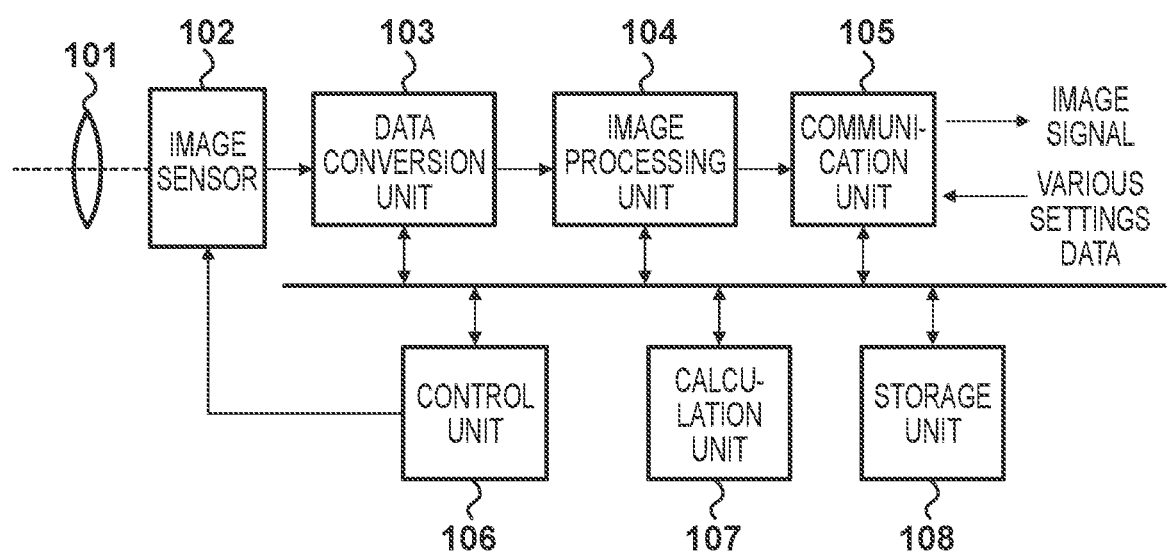
FIG. 2 is a block diagram showing an example of the arrangement of an image capturing apparatus according to the embodiment.

Next, an example of the arrangement of the image capturing apparatus 100 according to the embodiment will be described with reference to FIG. 2. An image sensor 102 converts an object image obtained through a lens unit 101 into an electrical signal (pixel signal). A data conversion unit 103 converts the pixel signal obtained by the image sensor 102 into a format suited to image processing. Then, an image processing unit 104 converts the pixel signal into an image signal through correction processing and development processing. The image signal is formed from a luminance signal and color difference signals, and the brightness distribution of the screen can be obtained using the luminance signal. A communication unit 105 outputs the obtained image signal as image data via an external interface. The image capturing apparatus 100 includes a storage unit 108 that can save various settings of the image sensor 102 and the like and the result of calculation by a calculation unit 107. The range of partial exposure regions of the image sensor 102 is also saved in the storage unit 108 and read out as needed.

The image sensor 102 allows setting an exposure for each partial region obtained by dividing an image capturing region, and allows performing exposure control. The calculation unit 107 calculates the correct exposure (or target exposure) of each partial region based on the brightness distribution of the screen obtained from image signals. A control unit 106 changes the shutter time and the gain by a control signal so as to set the calculated correct exposure in each partial region. When the calculated correct exposure differs from the current exposure, the shutter time and the gain are changed to change the exposure from the current exposure to the correct one. At this time, the shutter time and the gain are changed stepwise so that the exposure gradually comes close to the correct one. If the number of steps of change is decreased or the change amount in one change is increased, the exposure can reach the correct one in a shorter time. This case will be expressed as high response speed of exposure control in the embodiment. On the other hand, if the number of steps is increased or the change amount in one change is decreased, the time until the exposure reaches the correct one becomes longer. This case will be expressed as low response speed of exposure control in the embodiment.

However, if the response speed of exposure control is increased to change the exposure to the correct one at once, the brightness on the screen changes abruptly. The brightness change of the entire screen degrades the visibility. To prevent this, control is performed to change the exposure to a target correct exposure in a plurality of steps, suppress the exposure change amount in one change, and decrease the response speed of exposure control so that the exposure gradually comes close. Exposure control settings are saved in the storage unit 108 as predetermined control values regarding change amounts when changing the exposure of a partial region from a current exposure to a target one, such as an exposure change amount per unit time, an exposure change amount (or its upper limit value) per one change, and the number of divisions (steps) till the target exposure. If necessary, the user can change the control values.

The image sensor 102 can control the shutter time and the gain independently for each predetermined partial region of the light-receiving unit. More specifically, the control unit 106 executes control to shorten the shutter time and decrease the gain for a high-brightness partial region, and prolong the shutter time and increase the gain for a low-brightness partial region. Even when high- and low-brightness partial regions coexist within the screen, an image having a correct exposure as a whole can be obtained.

Figure 3A:
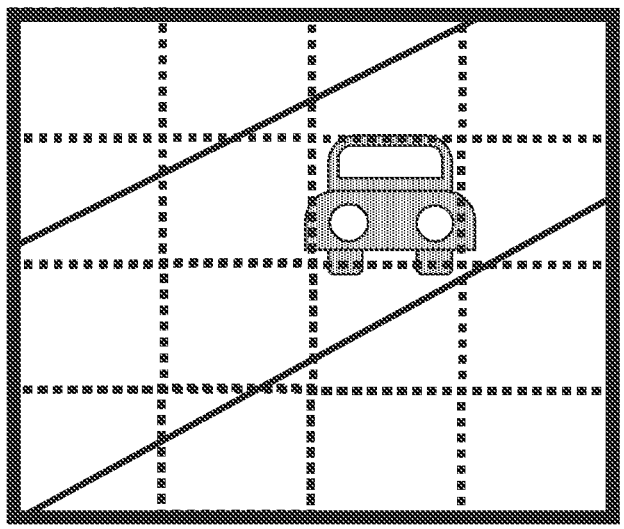
FIGS. 3A and 3B are views for explaining a partial region according to the embodiment.
Figure 3B:
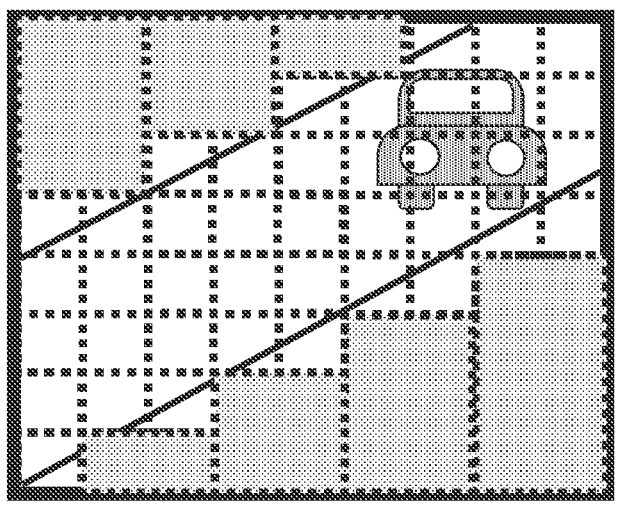

Next, region-specific exposure/image capturing according to the embodiment will be described with reference to FIGS. 3A and 3B. FIGS. 3A and 3B show an example of an object image and the image capturing range of partial regions of the image sensor 102 when the image capturing apparatus according to the embodiment captures an image. Image capturing is possible at exposure settings independently under the exposure conditions of partial regions set on the image sensor 102. The area of the partial region is set by the user in consideration of an object to be captured. In FIGS. 3A and 3B, the partial region is represented by a range surrounded by a dotted line set at almost the same size as that of an automobile to be captured.

FIG. 3A shows a case in which partial regions of almost the same size corresponding to an assumed object size are set on the entire screen. To the contrary, the size of the partial region may be changed in accordance with a position on the screen, as shown in FIG. 3B. In the embodiment, the exposure setting of each partial region is changeable.

When the partial region is much smaller than the size of the entire screen, even a brightness change of an object causes a change of the brightness almost only in a partial region where the object is captured, so degradation of the visibility of the screen is suppressed. Considering this, the response speed of exposure control is changed to be high, enabling image capturing that quickly responds to the brightness change of the object while maintaining the visibility of the entire screen. In contrast, when a partial region has a predetermined size or more with respect to the size of the entire screen, a range where the brightness changes becomes large and the visibility degrades seriously. To prevent this, the response speed of exposure control is changed to be as low as in a case in which exposure control is performed uniformly on the entire screen.

For example, FIG. 3B shows a first partial region group formed from partial regions each set at almost the same size as that of an automobile to be captured, and a second partial region group formed from partial regions each larger than the partial region of the first partial region group. It is often the case that only one object to be captured exists in each partial region in the first partial region group. In the second partial region group, however, an image capturing target in the partial region is not always one. It is not proper to adjust the exposure to some objects. Thus, the response speed of exposure control is increased for each partial region included in the first partial region group. In contrast, the response speed of exposure control is decreased for each partial region included in the second partial region group so that an image of an object can be captured appropriately.

In the embodiment, as a method of increasing the response speed, for example, the number of steps when changing the exposure from a current exposure to a target one is decreased, or the exposure change amount in one change is increased. The number of steps until the current exposure reaches the target one may be one or many as long as exposure control can follow a brightness change of an object.

In the embodiment, the threshold of the area of a partial region for determining whether to change the exposure control value is desirably set based on a value at which the area of the partial region becomes equal to or smaller than the range of the angle of view occupied by an object to be captured. By doing this, a brightness change of the partial region can be considered to be almost equal to a brightness change of the object. The range of the angle of view occupied by the object can be calculated by the calculation unit 107 based on a single image obtained by the image processing unit 104 or successive images. However, the user may designate a preferable threshold because the threshold changes depending on the object or the installation environment. Alternatively, a plurality of thresholds may be prepared to change stepwise the exposure control setting. The threshold, the control value, and the value of the area of each partial region are saved in the storage unit 108.

Figure 4:
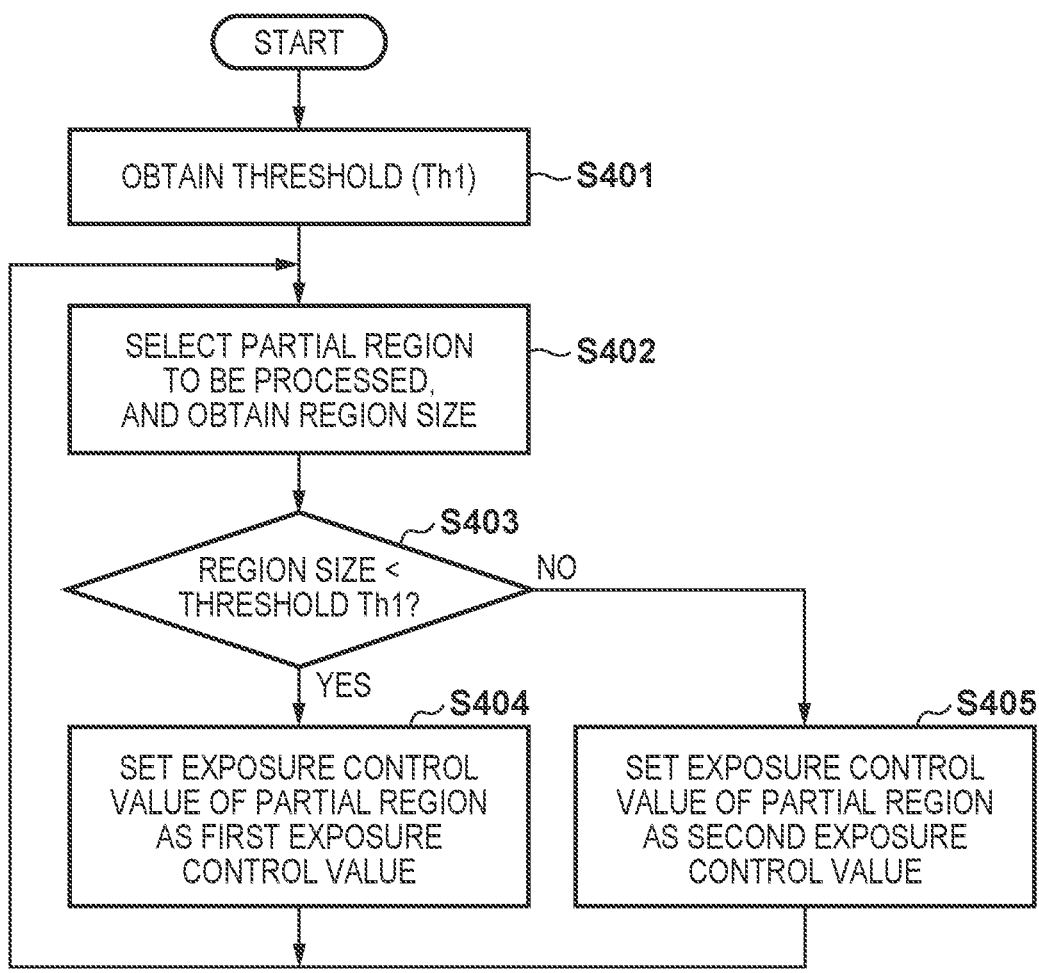
FIG. 4 is a flowchart showing an example of processing corresponding to the first embodiment.

Next, an operation sequence of the image capturing apparatus according to the first embodiment will be described with reference to FIG. 4. FIG. 4 is a flowchart of an example of an operation when setting the exposure control condition of each partial region of the image capturing apparatus 100 in the embodiment. The control unit 106 mainly executes each step in FIG. 4.

First, in step S401, the control unit 106 reads out from the storage unit 108 a threshold Th1 of the area of a partial region where exposure control is switched. Then, in step S402, the control unit 106 selects a partial region to be processed from partial regions included in the screen, and obtains the area (region size) of the partial region from the storage unit 108. In step S403, the control unit 106 compares the obtained region size with the threshold. If the region size is smaller than the threshold, the process shifts to step S404. If the region size is equal to or larger than the threshold, the process shifts to step S405.

In step S404, the control unit 106 reads out the first exposure control value among exposure control values from the storage unit 108, and sets the first exposure control value as the exposure control value of the partial region to be processed. The process then returns to step S402. In step S405, the control unit 106 reads out the second exposure control value among the exposure control values from the storage unit 108, and sets the second exposure control value as the exposure control value of the partial region to be processed. The process then returns to step S402.

The second exposure control value is a control value for decreasing the response speed of exposure control, compared to the first exposure control value. For example, compared to the first exposure control value, the second exposure control value decreases the number of steps until the exposure reaches a target correct exposure, or increases the exposure change amount in one change.

Again in step S402, the control unit 106 selects another partial region where no exposure control value has been set, and repeats the above-described processing. If exposure control values are set for all partial regions, the control unit 106 ends the process.

As described above, individual exposure control values are set for all partial regions included in the screen. While suppressing an unnecessary change of the brightness of the entire screen and maintaining the image quality, the exposure can be adjusted properly to an object whose brightness has changed abruptly.

Second Embodiment

The second embodiment will be described next. In the first embodiment, an exposure control value is set in two steps using only the single threshold Th1 as a threshold for determining a region size. In the second embodiment, an exposure control value is set in three or more steps using a plurality of thresholds.

Figure 5:
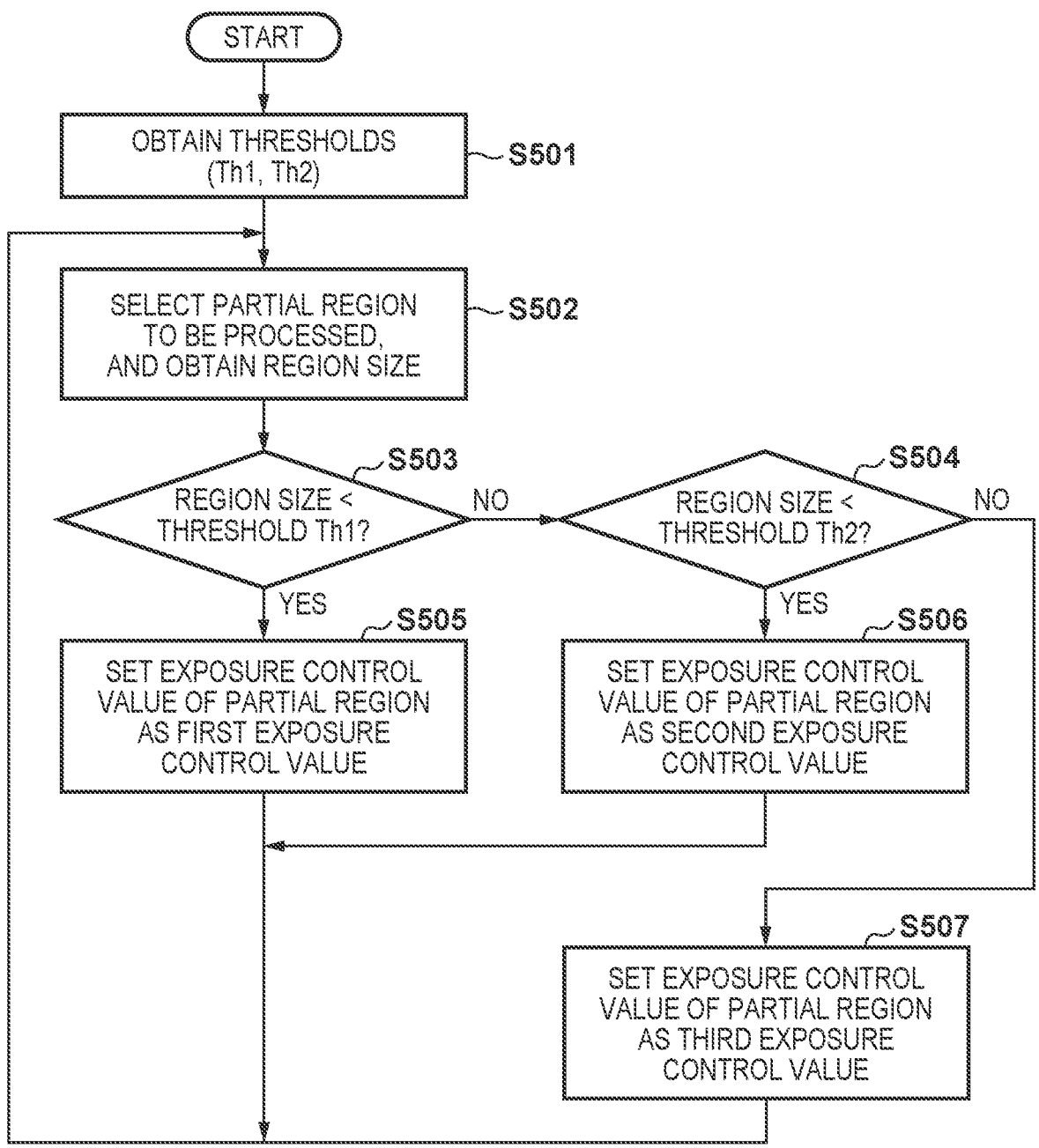
FIG. 5 is a flowchart showing an example of processing corresponding to the second embodiment.

A system configuration and the arrangement of an image capturing apparatus 100 in the second embodiment are similar to those described in the first embodiment, and a description thereof will not be repeated. An operation sequence in the image capturing apparatus 100 according to the second embodiment will be described below with reference to FIG. 5.

In the embodiment, two different thresholds Th1 and Th2 (Th1<Th2) are prepared as thresholds of the area of a partial region where the exposure control value is switched, and a storage unit 108 holds a total of three exposure control values corresponding to the respective thresholds. A control unit 106 mainly executes each step in FIG. 5.

First, in step S501, the control unit 106 reads out from the storage unit 108 the thresholds Th1 and Th2 of the area of a partial region where exposure control is switched. Then, in step S502, the control unit 106 selects a partial region to be processed from partial regions included in the screen, and obtains the area (region size) of the partial region from the storage unit 108. In step S503, the control unit 106 compares the obtained region size with the threshold Th1. If the region size is smaller than the threshold Th1, the process shifts to step S505. If the region size is equal to or larger than the threshold Th1, the process shifts to step S504. In step S505, the control unit 106 reads out the first exposure control value among exposure control values from the storage unit 108, and sets the first exposure control value as the exposure control value of the partial region to be processed. The process then returns to step S502.

In step S504, the control unit 106 compares the obtained region size with the threshold Th2. If the region size is smaller than the threshold Th2, the process shifts to step S506. If the region size is equal to or larger than the threshold Th2, the process shifts to step S507. In step S506, the control unit 106 reads out the second exposure control value among the exposure control values from the storage unit 108, and sets the second exposure control value as the exposure control value of the partial region to be processed. The process then returns to step S502. In step S507, the control unit 106 reads out the third exposure control value among the exposure control values from the storage unit 108, and sets the third exposure control value as the exposure control value of the partial region to be processed. The process then returns to step S502. The second exposure control value is a control value for decreasing the response speed of exposure control, compared to the first exposure control value. The third exposure control value is a control value for further decreasing the response speed of exposure control, compared to the second exposure control value.

Again in step S502, the control unit 106 selects another partial region where no exposure control value has been set, and repeats the above-described processing. If exposure control values are set for all partial regions, the control unit 106 ends the process.

As described above, in the second embodiment, the number of setting steps of the exposure control value is increased to more finely switch the response speed of exposure control on the screen. The second embodiment can further enhance the effect obtained by the image capturing apparatus in the first embodiment.

Third Embodiment

The third embodiment will be described next. In the first and second embodiments, an exposure control value is set based on the size of a partial region set in advance on the screen. In the above-described embodiments, the size of the partial region is set in advance in accordance with the size of an object to be captured, and a threshold for switching exposure control is determined in accordance with the size of the partial region. In the third embodiment, a threshold for switching exposure control is determined based on not the size of the partial region but the size of the object.

For example, when an object is smaller than an assumption with respect to a set partial region, a thing other than the object is highly likely included in the partial region. If the response speed of exposure control is increased, the visibility of the thing other than the object may degrade. To the contrary, when the object is equal to or larger than the assumption with respect to the partial region, it can be considered that only the object exists in the partial region, and the response speed of exposure control is desirably increased.

The size of an object can be specified based on, for example, a value input by the user. The input value (for example, area value) representing the size of the object is stored in a storage unit 108. A calculation unit 107 may recognize an object within the screen and specify the size of the object based on the number of pixels occupied by the object. As the object recognition method, for example, a background difference method is used to recognize an object from a difference between a background image and a captured image. The size of the object may be not only an area occupied by the object but also the area of a rectangular region including an extracted object region. A threshold for changing the exposure control value is saved in the storage unit 108 as a threshold for determining the size of an object.

A system configuration and the arrangement of an image capturing apparatus 100 in the third embodiment are substantially similar to those described in the first embodiment, and a description thereof will not be repeated. In the third embodiment, the calculation unit 107 of the image capturing apparatus 100 recognizes an object within the screen, calculates an area occupied within the screen, and obtains an area value. The remaining arrangement is similar to that in the first embodiment. An operation sequence in the image capturing apparatus 100 according to the third embodiment will be described below with reference to FIG. 6.

First, in step S601, a control unit 106 selects a partial region to be processed from partial regions included in the screen, and the calculation unit 107 calculates the area of an object included in the selected partial region. When the user has input an area value in advance, the control unit 106 reads out the user-input area value from the storage unit 108 and obtains it. Then, in step S602, the control unit 106 reads out from the storage unit 108 a threshold Th3 of the object area for which exposure control is switched. In step S603, the control unit 106 compares the obtained object area with the threshold Th3. If the object area is smaller than the threshold Th3, the process shifts to step S604. If the object area is equal to or larger than the threshold Th3, the process shifts to step S605.

In step S604, the control unit 106 reads out the third exposure control value among exposure control values from the storage unit 108, and sets the third exposure control value as the exposure control value of the partial region to be processed. The process then returns to step S601. In step S605, the control unit 106 reads out the fourth exposure control value among the exposure control values from the storage unit 108, and sets the fourth exposure control value as the exposure control value of the partial region to be processed. The process then returns to step S601.

The third exposure control value decreases the response speed of exposure control, compared to the fourth exposure control value. At this time, the third and fourth exposure control values may be respectively equal to or different from the second and first exposure control values in the first embodiment and the like.

Again in step S601, the control unit 106 selects another partial region and repeats the above-described processing. If exposure control values are set for all partial regions, the control unit 106 ends the process.

In the third embodiment, the method of switching the exposure control value in accordance with the object area has been explained. This method may be executed independently of or additionally to the exposure control value switching method described in the first and second embodiments.

When the method described in the third embodiment is executed independently of the method described in the first embodiment and the like, the control unit 106 operates to switch exposure control of a corresponding partial region in accordance with the size of an object detected in the partial region. At this time, a partial region where no object is detected can be treated equally to a partial region where an object smaller than the threshold is detected. Alternatively, a threshold for detecting a case in which no object exists in a partial region may be set. In the latter case, exposure control is performed at the lowest response speed in a partial region where no object exists.

When the method described in the third embodiment is executed additionally to the method described in the first embodiment and the like, for example, an object area may be calculated in step S601 for only a partial region whose region size is determined in step S403 of the first embodiment to be smaller than the threshold Th1. Then, an exposure control value already set for each partial region in the first embodiment can be changed in accordance with the size of the object included in each partial region.

More specifically, when the region size of a partial region is determined in step S403 of the first embodiment to be smaller than the threshold Th1, and an object detected in a partial region for which the first exposure control value is set is smaller than the threshold Th3, the first exposure control value can be changed to the third exposure control value. At this time, the third exposure control value decreases the response speed of exposure control, compared to the first exposure control value. The third exposure control value may be equal to the second exposure control value or may be a value for increasing the response speed, compared to the second exposure control value. When an object is smaller than an assumption with respect to the partial region, the response speed of exposure control can be decreased to prevent degradation of the visibility of a thing other than the object.

If an object larger than the threshold Th3 is detected in the partial region, the exposure control value changed to the third exposure control value in this manner is changed to the fourth exposure control value in step S605. At this time, if the fourth exposure control value is equal to the first exposure control value, the response speed can be returned to an original one.

Figure 6:
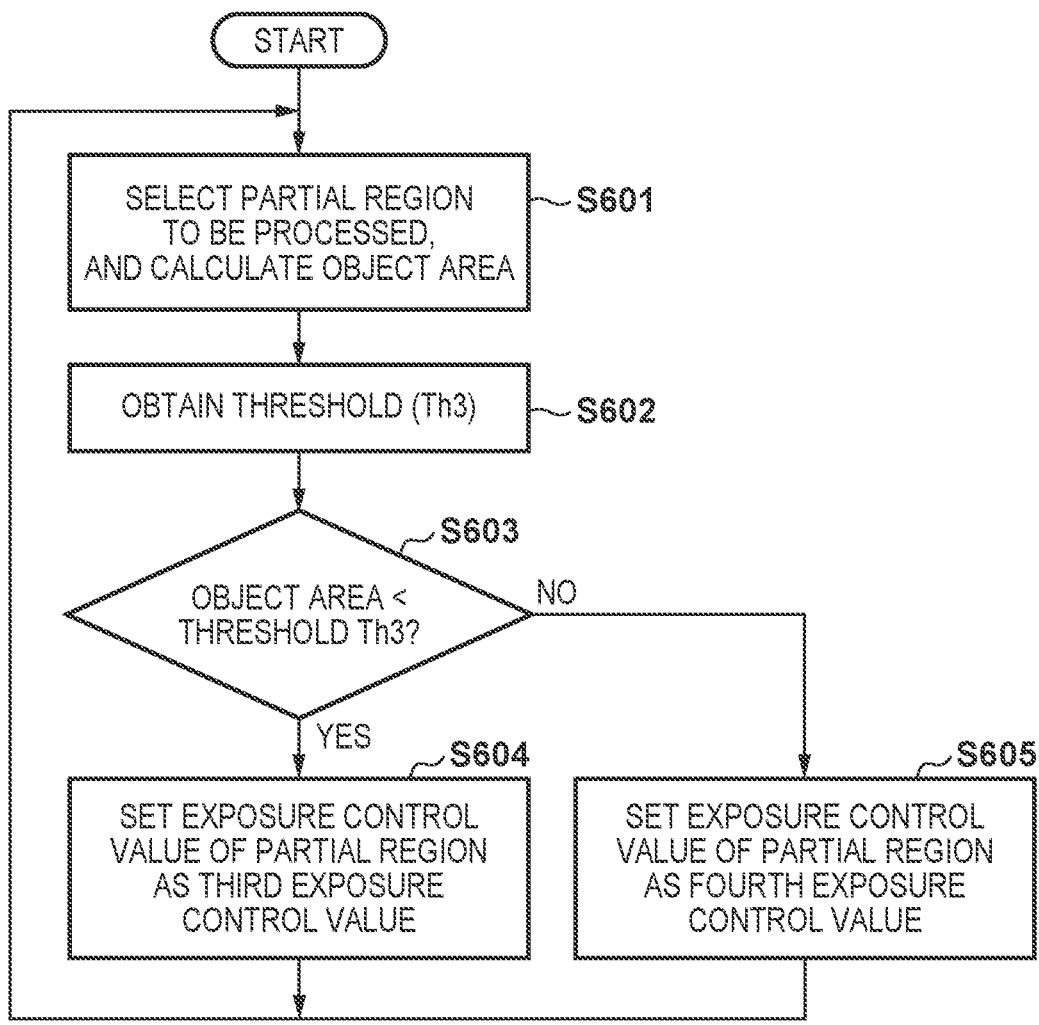
FIG. 6 is a flowchart showing an example of processing corresponding to the third embodiment.

Although a threshold for determining an object area is only the threshold Th3 in FIG. 6, the exposure control value may be switched stepwise.

As described above, according to the third embodiment, exposure control is switched based on the size of an object detected in a partial region. While suppressing an unnecessary change of the brightness of the entire screen and maintaining the image quality, the exposure can be adjusted properly to an object whose brightness has changed abruptly.

The disclosure is not limited to the above-described embodiments, and various changes and modifications can be made without departing from the spirit and scope of the disclosure. Therefore, to apprise the public of the scope of the disclosure, the following claims are made.

Other Embodiments

Embodiments of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-026469, filed on Feb. 19, 2020, which is hereby incorporated by reference herein in its entirety.

What is claimed is:

1. An image capturing apparatus comprising:
an image sensor capable of performing exposure control for each of a plurality of partial regions obtained by dividing an image capturing region; and
a control unit configured to perform exposure control of the image sensor,
wherein the control unit sets a control value of exposure control for each partial region based on a size of the partial region to decrease a response speed of exposure control for a larger partial region, and performs exposure control of the image sensor based on the set control value.

2. The apparatus according to claim 1, wherein the control unit compares an area of the partial region with a first threshold, sets a first control value for a partial region having an area smaller than the first threshold, and sets, for a partial region having an area not smaller than the first threshold, a second control value for decreasing the response speed, compared to the first control value.

3. The apparatus according to claim 2, wherein the control unit compares with a second threshold the area of the partial region having the area not smaller than the first threshold, sets, for a partial region having an area smaller than the second threshold, a third control value for decreasing the response speed, compared to the first control value, and increasing the response speed, compared to the second control value, and sets the second control value for a partial region having an area not smaller than the second threshold.

4. The apparatus according to claim 1, further comprising a specifying unit configured to specify a size of an object included in the partial region,
wherein the control unit further sets, based on the size of the object, the control value of the partial region where the object is detected.

5. The apparatus according to claim 4, wherein the control unit compares an area of the object with a third threshold, and if the area of the object is smaller than the third threshold, changes the control value of the partial region where the object is detected, to decrease the response speed.

6. The apparatus according to claim 5, wherein if the area of the object is not smaller than the third threshold, the control unit returns, to an original control value, the control value of exposure control of the partial region where the object is detected, which has been changed to decrease the response speed.

7. The apparatus according to claim 1, wherein the plurality of partial regions include a plurality of partial regions different in size.

8. The apparatus according to claim 7, wherein the plurality of partial regions different in size include a first partial region smaller in size than an object to be captured and a second partial region larger in size than the object.

9. The apparatus according to claim 1, wherein the control value is related to a change amount for changing an exposure of the partial region from a current exposure to a target exposure.

10. An image capturing apparatus comprising:
an image sensor capable of performing exposure control for each of a plurality of partial regions obtained by dividing an image capturing region;
a specifying unit configured to specify a size of an object included in the partial region; and
a control unit configured to perform exposure control of the image sensor,
wherein the control unit sets a control value of exposure control for each partial region based on a size of the object to decrease a response speed of exposure control for a smaller partial region of the object, and performs exposure control of the image sensor based on the set control value.

11. The apparatus according to claim 10, wherein the control unit compares an area of the object with a threshold, if the area of the object is smaller than the threshold, sets a third control value as the control value, and if the area of the object is not smaller than the threshold, sets as the control value a fourth control value for increasing the response speed, compared to the third control value.

12. A system comprising an image capturing apparatus, and an information processing apparatus configured to communicate via a network,
wherein the image capturing apparatus includes:
an image sensor capable of performing exposure control for each of a plurality of partial regions obtained by dividing an image capturing region; and
a control unit configured to perform exposure control of the image sensor, and
the control unit sets a control value of exposure control for each partial region based on a size of the partial region to decrease a response speed of exposure control for a larger partial region, and performs exposure control of the image sensor based on the set control value.

13. A system comprising an image capturing apparatus, and an information processing apparatus configured to communicate via a network,
wherein the image capturing apparatus includes:

an image sensor capable of performing exposure control for each of a plurality of partial regions obtained by dividing an image capturing region;

a specifying unit configured to specify a size of an object included in the partial region; and a control unit configured to perform exposure control of the image sensor, and the control unit sets a control value of exposure control for each partial region based on a size of the object to decrease a response speed of exposure control for a smaller partial region of the object, and performs exposure control of the image sensor based on the set control value.

14. A method of controlling an image capturing apparatus including:

an image sensor capable of performing exposure control for each of a plurality of partial regions obtained by dividing an image capturing region; and a control unit configured to perform exposure control of the image sensor, the method comprising:

causing the control unit to set a control value of exposure control for each partial region based on a size of the partial region to decrease a response speed of exposure control for a larger partial region; and causing the control unit to perform exposure control of the image sensor based on the set control value.

15. A method of controlling an image capturing apparatus including:

an image sensor capable of performing exposure control for each of a plurality of partial regions obtained by dividing an image capturing region;

a specifying unit configured to specify a size of an object included in the partial region; and a control unit configured to perform exposure control of the image sensor, the method comprising:

causing the control unit to set a control value of exposure control for each partial region based on a size of the object to decrease a response speed of exposure control for a smaller partial region of the object; and causing the control unit to perform exposure control of the image sensor based on the set control value.

16. A non-transitory computer-readable storage medium storing one or more programs including instructions that, when executed by a processor of an image capturing apparatus comprising an image sensor capable of performing exposure control for each of a plurality of partial regions obtained by dividing an image capturing region, cause the processor to perform operations of:

setting a control value of exposure control for each partial region based on a size of the partial region to decrease a response speed of exposure control for a larger partial region; and performing exposure control of the image sensor based on the set control value.

17. A non-transitory computer-readable storage medium storing one or more programs including instructions that, when executed by a processor of an image capturing apparatus comprising an image sensor capable of performing exposure control for each of a plurality of partial regions obtained by dividing an image capturing region, cause the processor to perform operations of:

specifying a size of an object included in the partial region;

setting a control value of exposure control for each partial region based on a size of the object to decrease a response speed of exposure control for a smaller partial region of the object; and performing exposure control of the image sensor based on the set control value.

\* \* \* \* \*